United States Patent
Kahlon et al.

(10) Patent No.: US 6,781,272 B2
(45) Date of Patent: Aug. 24, 2004

(54) INTEGRATED TORQUE CONVERTER AND STARTER-GENERATOR

(75) Inventors: Gurinder S. Kahlon, Canton, MI (US); Shawn H. Swales, Canton, MI (US); Daniel Denton, West Bloomfield, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 192 days.

(21) Appl. No.: 10/073,637

(22) Filed: Feb. 11, 2002

(65) Prior Publication Data

US 2003/0151319 A1 Aug. 14, 2003

(51) Int. Cl.[7] .............................................. H02K 47/04
(52) U.S. Cl. ........................... 310/113; 310/92; 310/78; 180/65.2
(58) Field of Search ................................ 310/112, 113, 310/101, 102 R, 75 R, 78, 92, 100; 180/65.1, 65.2, 65.6; 290/46, 47

(56) References Cited

U.S. PATENT DOCUMENTS

| | | | |
|---|---|---|---|
| 2,910,832 A | 11/1959 | Kelley | 60/362 |
| 3,652,883 A * | 3/1972 | Cone | 310/74 |
| 5,103,127 A | 4/1992 | Peter | 310/113 |
| 5,427,196 A * | 6/1995 | Yamaguchi et al. | 180/65.2 |
| 5,789,823 A | 8/1998 | Sherman | 290/47 |
| 5,796,195 A * | 8/1998 | Miyakawa | 310/68 B |
| 5,931,271 A | 8/1999 | Haka | 192/48.92 |
| 6,184,603 B1 | 2/2001 | Hamai et al. | 310/75 R |
| 6,208,036 B1 | 3/2001 | Evans et al. | 290/46 |
| 6,217,476 B1 | 4/2001 | Müller et al. | 477/5 |

* cited by examiner

Primary Examiner—Dang Le
(74) Attorney, Agent, or Firm—McMillan, Sobanski & Todd, LLC

(57) ABSTRACT

A vehicle, having an engine (20) and a transmission (26), also includes an integrated assembly (24) between the engine (20) and transmission (26) which includes both a torque converter assembly (32) and an integrated starter-generator (ISG) assembly (36). The ISG assembly (36) is mounted between the torque converter assembly (32) and the transmission (26), with an ISG rotor (56) rotationally coupled to an impeller (42) through an assembly having compliance to allow for proper assembly and operation of the integrated assembly (24).

20 Claims, 2 Drawing Sheets

INTEGRATED TORQUE CONVERTER AND STARTER-GENERATOR

BACKGROUND OF INVENTION

The present invention relates to vehicle drivetrains, and more particularly to torque converters integrated with starter-generators.

Conventionally, in automotive vehicles with internal combustion engines, starter motors and generators (or alternators) are separate components that are mounted in the engine compartment. The starter is employed only during engine start-up to rotate the engine crankshaft, and the generator (or alternator as the case may be) is used during engine operation to provide electricity for charging the vehicle battery and other vehicle electronics. This arrangement has drawbacks, however, in that the cost is generally high due to the fact that they are separate assemblies that each have their own working components and housings; also, the package space required is not as efficient as possible. This arrangement is particularly inefficient in that the two components rarely, if ever, operate at the same time.

With vehicles becoming smaller and the need to reduce the cost of the vehicles, it is desirable to minimize the cost and packaging space for these two components. This is particularly significant in vehicles that also employ an automatic transmission (or transaxle), and torque converter, because automatic transmission and torque converter overall take up more space than a manual transmission and clutch. As a result, some have attempted to integrate the starter and generator into a single unit. There is a need, however, to accomplish the integration in such a way that the packaging space and cost is minimized while still allowing for both the starter function and the generator function to perform adequately.

Thus, it is desirable to have a vehicle with an internal combustion engine and automatic transmission that overcomes the drawbacks of the conventional arrangement of components. In particular, it is desirable to have a system with an integral starter-generator that mounts compactly with a torque converter assembly, in order to reduce the number of components and the packaging space required in the vehicle's engine compartment.

SUMMARY OF INVENTION

In its embodiments, the present invention contemplates an integrated assembly adapted to mount in a vehicle between an engine, having a crankshaft assembly extending therefrom, and a transmission, having a transmission input shaft and stator shaft extending therefrom. The integrated assembly includes a housing adapted to mount between the engine and the transmission. It also includes a torque converter assembly, located within the housing and adapted to mount adjacent to the engine, with the torque converter assembly including a cover adapted to rotatably couple to the crankshaft assembly, and an impeller rotationally coupled to the cover, and with the impeller including an impeller hub adapted to mount about the stator shaft. A motor-generator is located within the housing adjacent to the impeller and adapted to mount between the torque converter assembly and the transmission, with the motor-generator having an ISG stator supported by the housing, an ISG rotor support mounted and rotatable relative to the housing, and with an ISG rotor mounted on the ISG rotor support adjacent to the ISG stator, and at least one flexible member connected between the ISG rotor support and the impeller such that the ISG rotor is rotationally coupled to the impeller.

The present invention further contemplates an integrated assembly adapted to mount in a vehicle between an engine, having a crankshaft assembly extending therefrom, and a transmission, having a transmission input shaft and stator shaft extending therefrom. The integrated assembly includes a housing adapted to mount between the engine and the transmission; and a torque converter assembly, located within the housing and adapted to mount adjacent to the engine, with the torque converter assembly including a cover adapted to rotatably couple to the crankshaft assembly, and an impeller rotationally coupled to the cover, and with the impeller including an impeller hub adapted to mount about the stator shaft. The integrated assembly also includes a bearing mounted between the impeller hub and the housing; and a motor-generator, located within the housing adjacent to the impeller and adapted to mount between the torque converter assembly and the transmission, with the motor-generator having an ISG stator supported by the housing, an ISG rotor support riding on a bearing mounted to the housing, and with an ISG rotor mounted on the ISG rotor support adjacent to the ISG stator, and a set of compliant pin assemblies connected between the ISG rotor support and the impeller such that the ISG rotor is rotationally coupled to the impeller.

The present invention also contemplates an integrated assembly adapted to mount in a vehicle between an engine, having a crankshaft assembly extending therefrom, and a transmission, having a transmission input shaft and stator shaft extending therefrom. The integrated assembly has a housing adapted to mount between the engine and the transmission; and a torque converter assembly, located within the housing and adapted to mount adjacent to the engine, with the torque converter assembly including a cover adapted to rotatably couple to the crankshaft assembly, and an impeller rotationally coupled to the cover, and with the impeller including an impeller hub adapted to mount about the stator shaft. The integrated assembly additionally has a motor-generator, located within the housing adjacent to the impeller and adapted to mount between the torque converter assembly and the transmission, with the motor-generator having an ISG stator supported by the housing, an ISG rotor support riding on ISG bearings mounted to the housing, with the impeller hub supported by the ISG rotor support, an ISG rotor mounted on the ISG rotor support adjacent to the ISG stator, and a rotationally rigid, axially flexible member connected between the ISG rotor support and the impeller such that the ISG rotor is rotationally coupled to the impeller; and a bearing mounted between the ISG rotor support and the housing.

An embodiment of the present invention allows for an integrated assembly that includes both a torque converter assembly and an integrated starter-generator assembly which mounts between an engine and a transmission.

An advantage of the present invention is that the packaging space required to include an ISG in an engine compartment of a vehicle is minimized.

Another advantage of the present invention is that a separate starter and generator are not required, reducing the cost of the overall assembly.

DETAILED DESCRIPTION

Figure 1:
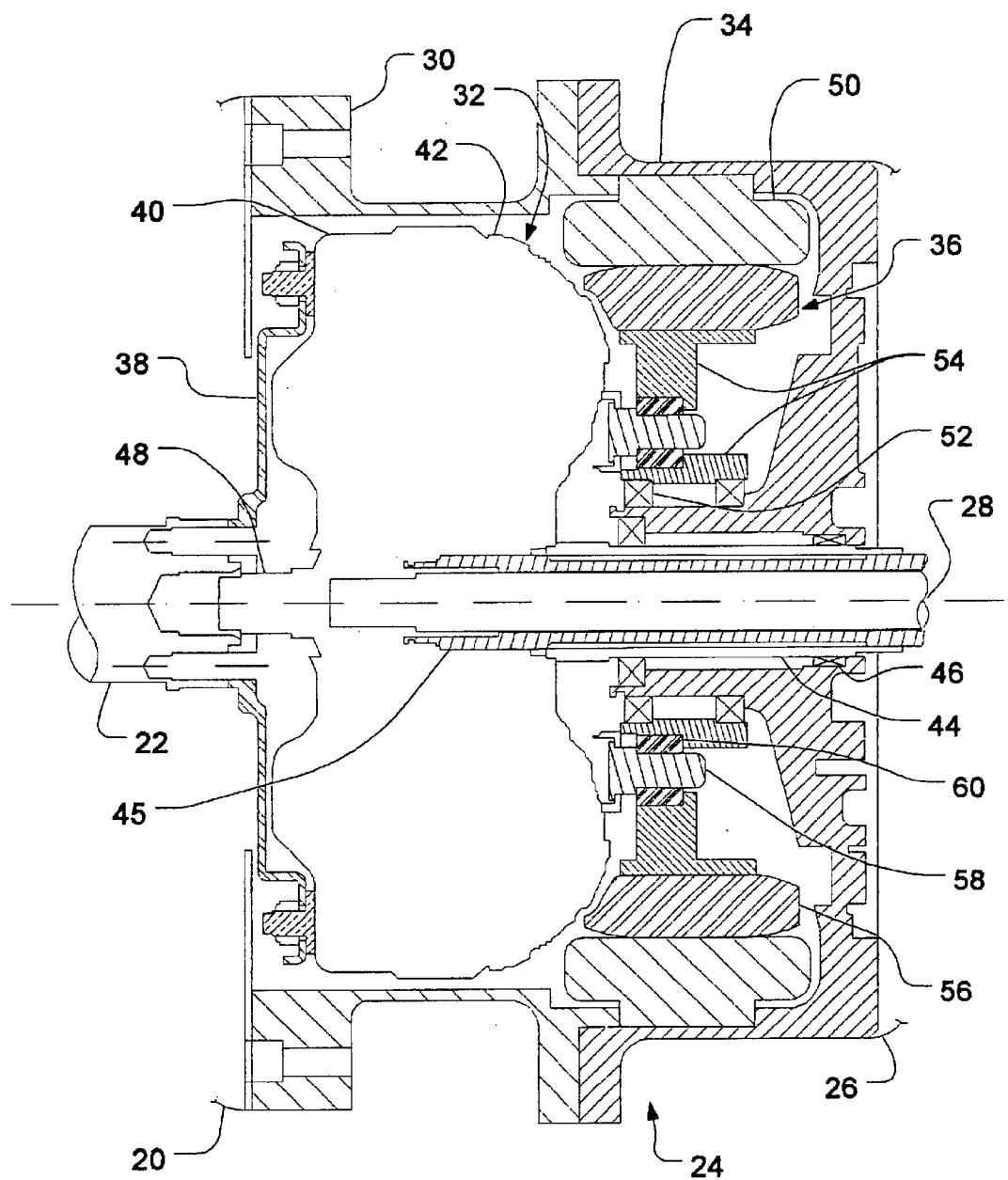
FIG. 1 is a schematic cross-section view of a torque converter assembly in accordance with the present invention.

FIG. 1 illustrates an engine 20, including a crankshaft assembly 22 having a flex plate 38, mounted to an integrated assembly 24, which in turn, mounts to a transmission 26, including a transmission input shaft 28. When referring to a transmission herein, it also means a transaxle, if so applicable. The integrated assembly 24 includes a bell housing 30, within which is mounted a torque converter assembly 32, and a motor housing 34, within which is mounted an integrated starter-generator (ISG) motor assembly 36. When referring to an ISG herein, it also means an integrated starter-alternator, if so applicable.

The torque converter assembly 32 is overall a generally conventional torque converter. It includes a cover 40 that is bolted to and rotates with the flex plate 38, and an impeller 42, which is welded to and rotates with the cover 40. The torque converter assembly 32 also includes a turbine (not shown) which mounts to the transmission input shaft 28, at the end nearest the engine 20, in a conventional fashion, and a stator/one-way-clutch assembly (not shown), which mounts to a stator shaft 45 in a conventional fashion. The impeller 42 includes an impeller hub 44, extending toward the transmission 26 end of the torque converter, which rides on a needle bearing 46. The cover 40 includes a hub 48, which is piloted into the engine crankshaft 22 and so is supported by the engine bearings (not shown). With this conventional arrangement for supporting the torque converter assembly 32, the loading on the crankshaft 22 is similar to that of a conventional production torque converter, so the present invention does not require changes to the crankshaft or its bearings.

One will note that the exterior of the impeller 42 is semi-toroidal in shape. This is a conventional shape and is due to the flow requirements for transferring torque via the fluid within the assembly 32. As will be discussed below, the present invention takes advantage of this shape to minimize the axial length of the integrated assembly 24.

The ISG assembly 36 includes an ISG stator 50, which is mounted to the motor housing 34. The motor housing 34 not only supports the ISG stator 50, but also extends around the ISG assembly 36 and secures the needle bearing 46 between itself and the impeller hub 44. The motor housing 34 additionally supports a pair of rotor support bearings 52, upon which a rotor support 54 rides. Since the motor housing 34 supports both the rotor support bearings 52 and the ISG stator 50, the number of parts in a tolerance stack-up are minimized, thus assuring good fit when the parts are assembled, and a small magnetic air gap for good electric machine performance.

The ISG assembly 36 also includes an ISG rotor 56, which rides on the rotor support 54 and is mounted adjacent to the ISG stator 50. Since the ISG assembly 36 is located between the torque converter assembly 32 and the transmission 26, and with the inherent toroidal shape of the impeller 42, this allows the end turns of the ISG rotor 56 to axially overlap the impeller 42. This configuration, then, allows for a reduced overall axial length of the integrated assembly 24, while also minimizing the diameter of the assembly. The packaging space, then, for the overall integrated assembly 24 is minimized.

A series of ISG pins 58 mount to the impeller 42, and also engage the ISG rotor support 54 via a series of generally cylindrical, elastomeric bushings 60. As discussed above, the torque converter assembly is mounted on a bearing system that includes the needle bearing 46 and the crankshaft 22, while the ISG rotor support 54 rides on rotor support bearings 52. Due to the fact that these two independent bearing systems are used, compliance is needed between the ISG rotor and the torque converter assembly. This is achieved through the elastomeric bushings 60. Through these pins 58 and bushings 60 the ISG rotor 56 is rotationally coupled to and driven by the impeller 42. Thus, the torque converter assembly 32 and the ISG assembly 36 are coupled together and integrated into one compact integrated assembly 24.

The operation of the integrated assembly 24 in a vehicle powertrain will now be discussed. While the engine 20 is running, it drives the crankshaft 22 and flex plate 38, which in turn drives the torque converter cover 40 and impeller 42. The impeller 42 transfers torque to the turbine (not shown) in a conventional fashion, which drives the transmission input shaft 28. So far, this is the same as with a conventional vehicle powertrain. The impeller 42 also drives the ISG rotor 56 via the ISG pins 58 and rotor support 54. This rotation will energize the ISG stator 50, which will charge a conventional vehicle battery (not shown), and provide electricity for other vehicle electronics. Thus, the ISG motor-generator assembly 36 is in a generator mode.

On the other hand, if the engine is off, and a vehicle operator turns the vehicle key (not shown) to start, then a vehicle battery (not shown) will energize the ISG stator 50, causing it to drive the ISG rotor 56. The ISG rotor 56 will then drive the impeller 42, which will, in turn, drive the engine crankshaft 22. Now, the ISG motor-generator assembly 36 is in an engine start (motor) mode.

Figure 2:
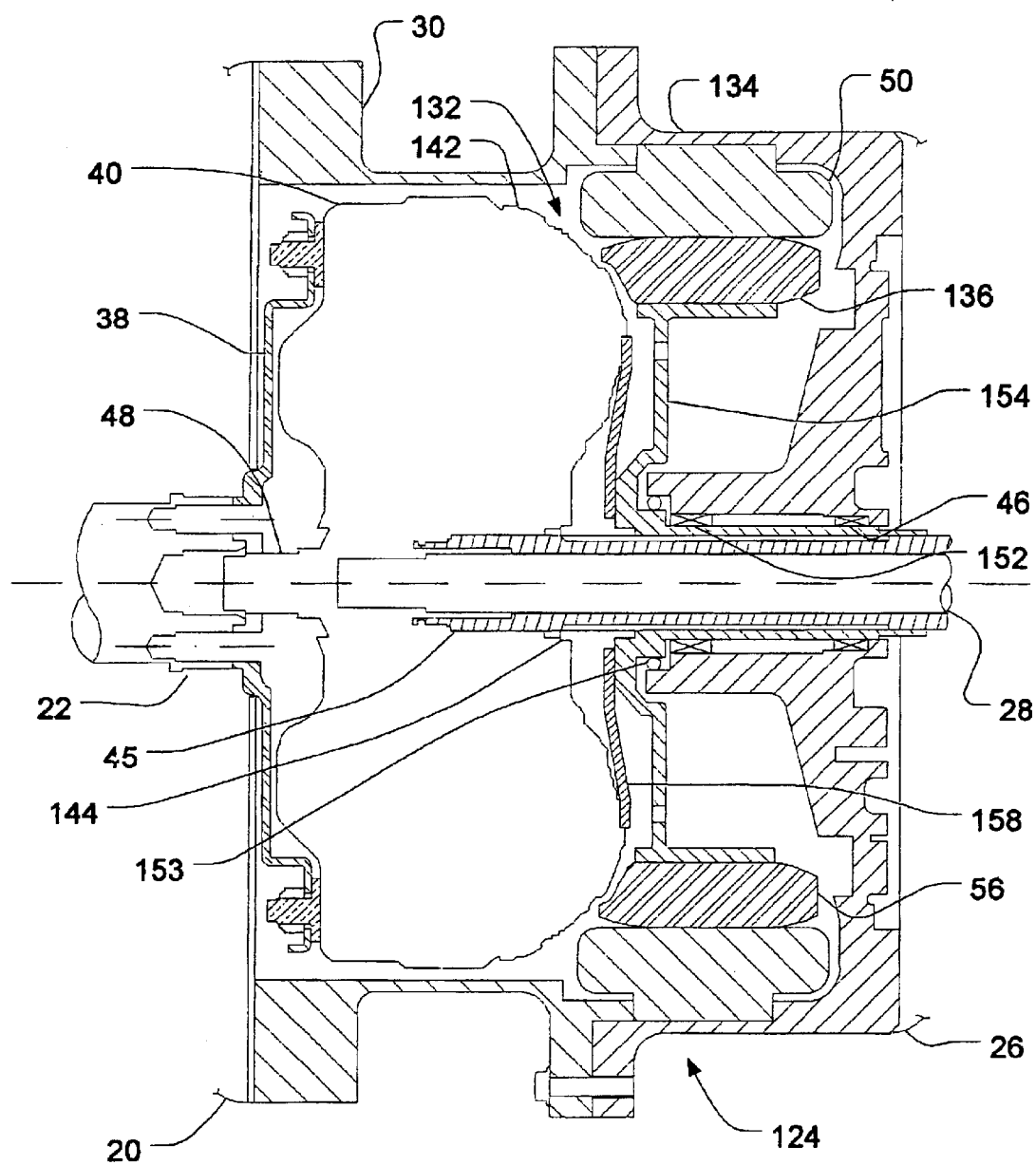
FIG. 2 is a view similar to FIG. 1, illustrating a second embodiment of the invention.

FIG. 2 illustrates a second embodiment of the present invention. In this embodiment, elements that are the same as in the first embodiment will be designated with the same element numbers, but those that have changed or have been added will be designated with 100 series numbers. The engine 20, transmission 26, crankshaft 22, flex plate 38, torque converter housing 30, torque converter cover 40, transmission input shaft 28, ISG stator 50, ISG rotor 56, and stator shaft 45 are essentially the same as in the first embodiment.

The motor housing 134 mounts the ISG stator 50, and also extends radially inward to mount both the needle bearing 46 and a second needle bearing 152. The ISG rotor support 154 mounts radially within these two bearings 46, 152. Both of these bearings 46, 152 are inside the sealed area of the transmission 26, so they are within the oil bath provided by the transmission 26. This will reduce the friction and improve the wear life of the bearings 46, 152. The ISG rotor support also mounts to the impeller hub 144 via a static seal 153. As a result, the impeller hub 144 is supported and rides on the bearings 46, 152 via the ISG rotor support 154. Only a static seal 153 is needed since the two components rotate together as one unit.

There is an ISG flex plate 158 which connects between the rotor support 154 and the impeller 142. This ISG flex plate 158 creates the rigid rotational connection for transferring torque between the torque converter assembly 132 and the motor assembly 136, while also allowing for some axial play between the two assemblies. It allows for lateral compliance to account for engine/transmission misalignment and torque converter ballooning under pressure.

While certain embodiments of the present invention have been described in detail, those familiar with the art to which this invention relates will recognize various alternative designs and embodiments for practicing the invention as defined by the following claims.

What is claimed is:

1. An integrated assembly adapted to mount in a vehicle between an engine, having a crankshaft assembly extending therefrom, and a transmission, having a transmission input shaft and stator shaft extending therefrom, the integrated assembly comprising:
   a housing adapted to mount between the engine and the transmission;
   a torque converter assembly, located within the housing and adapted to mount adjacent to the engine, with the torque converter assembly including a cover adapted to rotatably couple to the crankshaft assembly, and an impeller rotationally coupled to the cover, and with the impeller including an impeller hub adapted to mount about the stator shaft; and
   a motor-generator, located within the housing adjacent to the impeller and adapted to mount between the torque converter assembly and the transmission, with the motor-generator having an ISG stator supported by the housing, an ISG rotor support mounted and rotatable relative to the housing, and with an ISG rotor mounted on the ISG rotor support adjacent to the ISO stator, and at least one flexible member located and connected between the ISG rotor support and the impeller such that the ISG rotor is rotationally coupled to the impeller.

2. The integrated assembly of claim 1 wherein the at least one flexible member is an ISG flex plate.

3. The integrated assembly of claim 1 wherein the at least one flexible member is a set of compliant pin assemblies.

4. The integrated assembly of claim 3 wherein the set of compliant assemblies includes a plurality of rigid pins connected to the impeller and a plurality of flexible cylinders, one each mounted between each of the pins and the ISG rotor support.

5. The integrated assembly of claim 1 further including at least one bearing mounted between the ISG rotor support and the housing.

6. The integrated assembly of claim 5 further including at least one bearing mounted between the housing and the impeller hub.

7. The integrated assembly of claim 1 wherein the impeller includes an outer radial surface, and the ISG rotor includes an outer radial surface that is radially inward of the impeller outer radial surface.

8. The integrated assembly of claim 1 wherein the impeller has a generally semi-toroidal shape at a location adjacent to the motor-generator, and wherein the ISG rotor has a surface adjacent to the impeller that is shaped to match the shape of the impeller at the location.

9. An integrated assembly adapted to mount in a vehicle between an engine, having a crankshaft assembly extending therefrom, and a transmission, having a transmission input shaft and stator shaft extending therefrom, the integrated assembly comprising:
   a housing adapted to mount between the engine and the transmission;
   a torque converter assembly, located within the housing and adapted to mown adjacent to the engine, with the torque converter assembly including a cover adapted to rotatably couple to the crankshaft assembly, and an impeller rotationally coupled to the cover, and with the impeller including an impeller hub adapted to mount about the stator shaft;
   a bearing mounted between the impeller hub and the housing; and
   a motor-generator, located within the housing adjacent to the impeller and adapted to mount between the torque converter assembly and the transmission, with the motor-generator having an ISG stator supported by the housing, an ISG rotor support riding on a bearing mounted to the housing, and with an ISG rotor mounted on the ISG rotor support adjacent to the ISG stator, and a set of compliant pin assemblies connected between the ISG rotor support and the impeller such that the ISG rotor is rotationally coupled to the impeller.

10. The integrated assembly of claim 9 wherein the set of compliant pin assemblies includes a plurality of rigid pins connected to the impeller and a plurality of flexible cylinders, one each mounted between each of the pins and the ISG rotor support.

11. The integrated assembly of claim 9 wherein the impeller includes an outer radial surface, and the ISG rotor includes an outer radial surface that is radially inward of the impeller outer radial surface.

12. The integrated assembly of claim 11 wherein the impeller has a generally semi-toroidal shape at a location adjacent to the motor-generator, and wherein the ISG rotor has a surface adjacent to the impeller that is shaped to match the shape of the impeller at the location.

13. The integrated assembly of claim 1 wherein the impeller has a generally semi-toroidal shape at a location adjacent to the motor-generator, and wherein the ISG rotor has a surface adjacent to the impeller that is shaped to match the shape of the impeller at the location.

14. An integrated assembly adapted to mount in a vehicle between an engine, having a crankshaft assembly extending therefrom, and a transmission, having a transmission input shaft and stator shaft extending therefrom, the integrated assembly comprising:
   a housing adapted to mount between the engine and the transmission;
   a torque converter assembly, located within the housing and adapted to mount adjacent to the engine, with the torque converter assembly including a cover adapted to rotatably couple to the crankshaft assembly, and an impeller rotationally coupled to the cover, and with the impeller including an impeller hub adapted to mount about the stator shaft; and
   a motor-generator, located within the housing adjacent to the impeller and adapted to mount between the torque converter assembly and the transmission, with the motor-generator having an ISG stator supported by the housing, an ISG rotor support riding on ISG bearings mounted to the housing, with the impeller hub supported by the ISG rotor support, an ISG rotor mounted on the ISG rotor support adjacent to the ISG stator, and a rotationally rigid, axially flexible member connected between the ISG rotor support and the impeller such that the ISG rotor is rotationally coupled to the impeller.

15. The integrated assembly of claim 14 wherein the rotationally rigid, axially flexible member is an ISG flex plate.

16. The integrated assembly of claim 14 further including a static seal contained between the impeller hub and the ISG rotor support.

17. The integrated assembly of claim 14 wherein the impeller includes an outer radial surface, and the ISG rotor includes an outer radial surface that is radially inward of the impeller outer radial surface.

18. The integrated assembly of claim 17 wherein the impeller has a generally semi-toroidal shape at a location adjacent to the motor-generator, and wherein the ISG rotor has a surface adjacent to the impeller that is shaped to match the shape of the impeller at the location.

19. The integrated assembly of claim 14 wherein the impeller has a generally semi-toroidal shape at a location adjacent to the motor-generator, and wherein the ISG rotor has a surface adjacent to the impeller that is shaped to match the shape of the impeller at the location.

20. The integrated assembly of claim 14 wherein the ISG bearings comprises two spaced apart bearings.

* * * * *